United States Patent [19]

Nishino et al.

[11] Patent Number: 5,371,603
[45] Date of Patent: Dec. 6, 1994

[54] DIGITAL VIDEO SIGNAL REPRODUCING APPARATUS

[75] Inventors: Masakazu Nishino, Kashiwara; Tatsurou Juri, Osaka; Hideki Otaka, Neyagawa, all of Japan

[73] Assignee: Matsushita Electric Industrial Co., Ltd., Osaka, Japan

[21] Appl. No.: 214,000

[22] Filed: Mar. 15, 1994

Related U.S. Application Data

[63] Continuation of Ser. No. 739,315, Aug. 1, 1991, abandoned.

[30] Foreign Application Priority Data

Aug. 9, 1990 [JP] Japan .................. 2-212546

[51] Int. Cl.$^5$ ............................. H04N 5/76
[52] U.S. Cl. .................. 358/335; 358/339; 358/340
[58] Field of Search ........... 358/335, 336, 340, 339, 358/312; 348/616, 620; 360/33.1, 32; H04N 5/76

[56] References Cited

U.S. PATENT DOCUMENTS 4,686,584 8/1987 Kojima et al. .................. 358/312
4,706,132 11/1987 Takayama et al. ............... 358/336
5,073,821 12/1991 Juri .................................. 358/133
5,109,451 4/1992 Aono et al. ...................... 358/133

FOREIGN PATENT DOCUMENTS 0415699 3/1991 European Pat. Off. .
8702210 4/1987 WIPO .

*Primary Examiner*—Tommy P. Chin
*Assistant Examiner*—Huy Nguyen
*Attorney, Agent, or Firm*—Wenderoth, Lind & Ponack

[57] ABSTRACT

A digital video signal reproducing apparatus is arranged such that when a low frequency component of a reproduced signal is extracted, the reproduced signal forms a reproduced image plane. When a low frequency component of a reproduced signal is extracted but a high frequency component thereof is not extracted, the low frequency component thus extracted is compared with a low frequency component of a previously or subsequently reproduced signal. If the two low frequency components are substantially equal to each other, the reproduced signal is concealed to form a reproduced image plane, and if not substantially equal to each other, the reproduced signal forms a reproduced image plane without being concealed.

17 Claims, 4 Drawing Sheets

DIGITAL VIDEO SIGNAL REPRODUCING APPARATUS

This application is a continuation of now abandoned application Ser. No. 07/739,315, filed Aug. 1, 1991 abandoned.

BACKGROUND OF THE INVENTION

1. Field of the Invention

This invention relates to a digital video signal reproducing apparatus which employs high-efficiency coding and which is used in digital VTR or the like.

2. Description of the Prior Art

Together with the digitization of video signals, the high-efficiency encoding technology has become important. As an effective method for high-efficiency encoding, orthogonal transformation encoding is known. The orthogonal transformation is a technique for transforming a time series signal to an orthogonal component (for example, frequency component), such as Hadamard transformation and discrete cosine transformation (DCT). Of these, in particularly, DCT is now being examined with keen interest as an orthogonal transformation method suitable for the high efficiency encoding of video information.

An explanation will be made below on a digital video signal recording/reproducing apparatus in which the DCT is employed as an orthogonal transformation encoding method. For high-efficiency encoding of video signals, two-dimensional DCT has been frequently used, which has 8 horizontal pixels and 8 vertical pixels, totaling 64 pixels, as one block. This DCT coefficient is subjected to quantizing and variable length encoding for recording.

In this case, the variable length encoding allocates a small code length to a code word having a large occurrence probability and a large code length to a code word having a small occurrence probability, for which a Huffman code or the like has been frequently used. However, use of the variable length encoding method causes the data rate after encoding to change depending on image quality. As a result, with the conventional arrangement, a buffer memory is provided after the variable length encoding. In order to prevent the data amount in the buffer memory from overflowing or underflowing, the data is controlled in such a manner that when the data amount in the buffer memory is increased, the DCT coefficient is largely rounded when quantized, and on the other hand, when it is decreased, its rounding is made small.

On the other hand, the digital video signal reproducing apparatus can reproduce a digital video signal through structural components having inverse characteristics to those of components of the digital video signal recording apparatus.

In this case, however, when a special effect such as the high-speed search or the like is to be made for a VTR (Video Tape Recorder), recorded data cannot always be detected continuously in the same way as in the case of recording, so that discontinuous data are inputted to the digital video signal reproducing apparatus. Accordingly, a case may occur in which all orthogonal components necessary to execute the inverse DCT operation cannot be inputted even in a block unit.

As a result, since the inverse DCT operation would be executed even when all orthogonal components are not inputted, a large image quality degradation in the reproduced image plane would be caused.

Such a problem arises not only when the reproducing is made in a special reproducing mode, but also when it is made in a normal reproducing mode. Furthermore, when errors are generated in the transmission line, the same problem as above may arise.

Particularly, in the apparatus using variable length encoding as shown above, even when only one bit of error is generated in the transmission line, code synchronization cannot be obtained and the subsequent data cannot be decoded, so that the error thus generated is propagated to cause a large degradation in image quality. This problem has been pointed out as a difficult one in an apparatus such as a VTR or the like which is highly probable in error generation.

As a result, with the conventional digital video signal reproducing apparatus, image reproduction through the inverse DCT operation is prohibited for a block for which all orthogonal components cannot be detected, and the image for the block is formed by using a previously reproduced signal again, thus preventing the image quality from being largely degraded.

With the conventional digital video signal reproducing apparatus as above, however, the image plane is not updated over a long period of time during the high-speed reproduction in many cases, so that digital video signals at different times confusingly exist in the same image plane, resulting in making a high-speed reproduction image plane which is largely degraded.

Particularly, when the reproducing speed is very high, it is difficult to detect all orthogonal components of each block for almost all the blocks of recorded signals, so that the scene change cannot be distinguished and, in the worst case, the reproduced image plane cannot be formed at all.

SUMMARY OF THE INVENTION

An object of this invention is to provide a digital video signal reproducing apparatus which can generate, in a high speed reproduction mode and even in a super high speed reproduction mode, a reproduced image updated over a wide area of an image plane and promptly responsive to a scene change.

In order to attain the above-mentioned object, a digital video signal reproducing apparatus of this invention comprises reproducing means for extracting a recorded signal from a recording medium to obtain a reproduced signal, low frequency component detection means for detecting a low frequency component of said reproduced signal, and concealing means for concealing said reproduced signal, in which said concealing means conceals said reproduced signal when said low frequency component detection means has not detected the low frequency component, but it does not conceal said reproduced signal when said low frequency component detection means has detected the low frequency component.

With the above-mentioned arrangement, when the low frequency component of said reproduced signal is extracted, a reproduced image plane is formed by said reproduced signal, so that the reproduced image plane can be always updated over a wide area thereof and that a scene change can be adequately distinguished.

Preferably, a digital video signal reproducing apparatus comprises reproducing means for extracting a recorded signal from a recording medium to obtain a reproduced signal, low/high frequency component detection means for detecting low and high frequency components of said reproduced signal, concealing means for concealing said reproduced signal, and low frequency component comparator means for comparing the low frequency component of said reproduced signal with a low frequency component of a previously or subsequently reproduced signal, in which when said low/high frequency component detection means has not detected the low frequency component of said reproduced signal, said concealing means conceals said reproduced signal, but when said low/high frequency component detection means has detected the low frequency component of said reproduced signal and has not detected the high frequency component of the same, if a comparison result of said low frequency component comparator means is such that the low frequency component of said reproduced signal and the low frequency component of the previously or subsequently reproduced signal near said reproduced signal on a time basis are substantially equal to each other, said concealing means conceals said reproduced signal, and on the other hand, if the comparison result is such that the two low frequency component are not substantially equal to each other, said concealing means does not conceal said reproduced signal, to thereby form a reproduced image plane.

With this arrangement, when the low frequency component of said reproduced signal can be extracted and the high frequency component thereof cannot be extracted, comparison is made with a digital video signal already existing on the image plane to detect a scene change image plane or a still image plane. As a result, in the case of a changing scene image plane can be updated by the newly extracted signal over a wide area of the image plane. However, in the case of a still image, the image plane is updated by the reproduced signal having the low frequency component only and having no high frequency component, so that degradation in image quality can be prevented by eliminating the high frequency component, which means that a reproduced image plane with higher image quality can be formed and the practical effect is very large.

The low frequency components are frequency components of the video signal which are in a frequency range lower than a relatively low specific frequency close to DC and which include DC components. The high frequency components are AC components of the video signal which are in a frequency range higher than the specific frequency. In the simplest manner, the low frequency components may be DC components of the video signal and the high frequency component may be AC components of the same.

DESCRIPTION OF THE PREFERRED EMBODIMENTS

Figure 1:
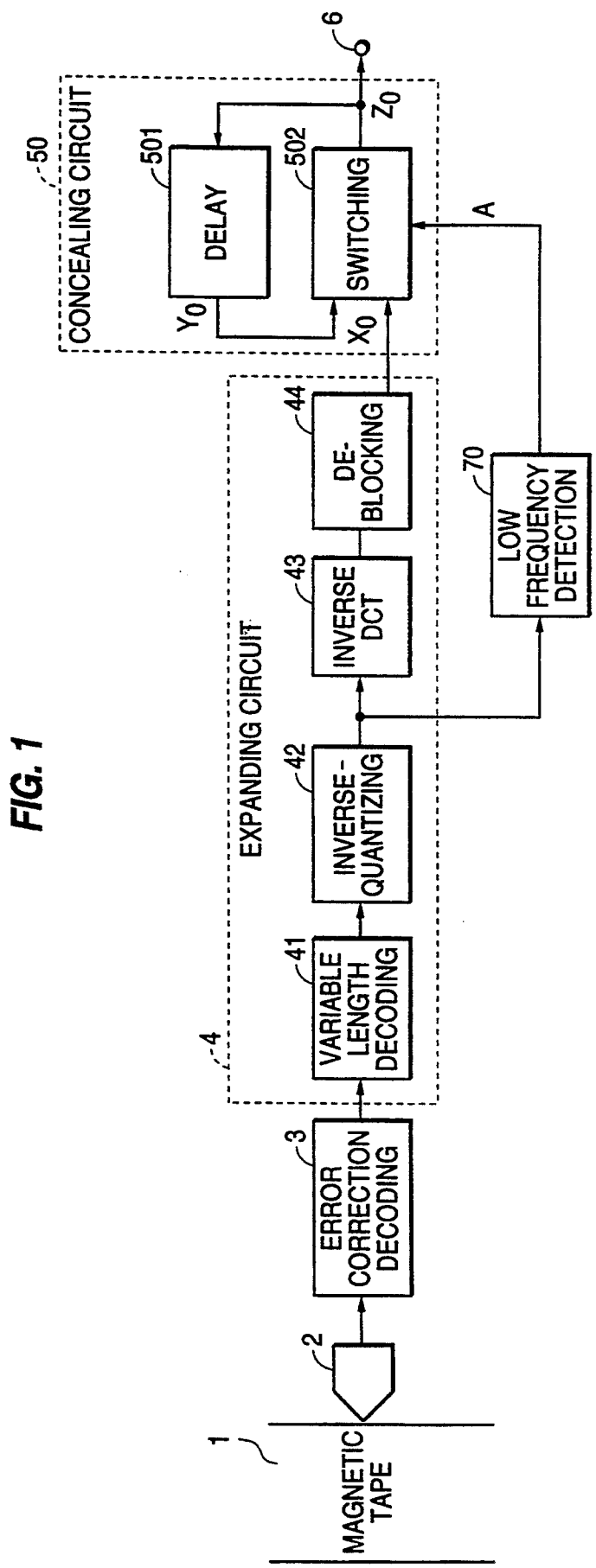
FIG. 1 is a block diagram of a digital video signal reproducing apparatus according to a first embodiment of this invention.

FIG. 1 is a block diagram of a digital video signal reproducing apparatus according to a first embodiment of this invention. This embodiment shows an arrangement of a digital VTR as an example, in which a recording medium for recording digital video signals is a magnetic tape and the above-mentioned DCT is adopted as an orthogonal transformation method. In FIG. 1, a magnetic tape 1 stores a recording signal which is a digital video signal subjected to compression processings such as transforming, quantizing and variable length encoding by the DCT method and error correction encoding. A recording head 2 detects the recording signal to obtain a reproduced signal. An error correction decoding circuit 3 decodes an error correction coded signal from the reproduced signal. An expanding circuit 4 comprises a variable length decoding circuit 41 for decoding a variable length code to obtain a quantized signal, an inverse quantizing circuit 42 for inverse-quantizing the quantized signal to obtain a DCT coefficient, an inverse-DCT circuit 43 for performing inverse-DCT transformation of the DCT coefficient to obtain a block signal, and a de-blocking circuit 44 for de-blocking the block signal to thereby return it to the original digital video signal. These processes are the inverse processes to the compression processes carried out when the video signal is recorded on the magnetic tape 1 as the recording signal.

Also, a low frequency detection circuit 70 detects whether low frequency components are extracted on a block by block basis from the signal sent from the inverse quantizing circuit 42 of the expanding circuit 4 and outputs a detection signal A. For this, it may detect whether or not a DCT coefficient corresponding to a low frequency component is extracted for the reproduced DCT coefficient which is inversely quantized by the inverse-quantizing circuit 42 and inputted to the inverse-DCT circuit 43.

A concealing circuit 50 comprises a delay circuit 501 and a switching circuit 502. The switching circuit 502 switches a signal $X_0$ sent from the expanding circuit 4 and a signal $Y_0$ sent from the delay circuit 501 in such a manner that when the low frequency component is detected for the detection signal A by the low frequency detection circuit 70, the signal $X_0$ is outputted, and when not detected, the signal $Y_0$ is outputted, which is outputted as a signal $Z_0$ therefrom. The delay circuit 501 delays the signal $Z_0$ for one-frame period to form the signal $Y_0$. The signal $Z_0$ from the concealing circuit 501 is outputted from an output terminal 6 as a reproduced digital signal.

The low frequency detection circuit 70 detects whether or not the low frequency component is extracted in a block unit from the orthogonal components to be inputted to the inverse DCT circuit 43 of the reproduced signal sent from the recording head 2. At the time when the reproduced signal is inversely quantized by the inverse-quantizing circuit 4, that is, with respect to the input signal to the inverse-DCT circuit 43, it can be judged whether or not a desired low frequency component is normally extracted. As a result, in a case where the low frequency detection circuit 70 detects that the low frequency component cannot be extracted, similar to the conventional case, the signal $Y_0$, which was reproduced at the time just before as an output signal of the delay circuit 501, is directly reproduced. On the other hand, in a case where the low frequency detection circuit 70 detects that the low frequency component is extracted, the signal $X_0$, which is an output signal of the expanding circuit 4, is reproduced. In this case, the low frequency detection circuit 70 detects only whether the low frequency component is extracted or not and does not detect the presence/absence of the extraction of the high frequency component. Accordingly, the signal $X_0$ as an output signal of the expanding circuit 4 upon detection of the extraction of the low frequency component may be a signal which is obtained by decoding and de-blocking the orthogonal components having the low frequency component only, that is, having no high frequency component, and a signal which is obtained by decoding and de-blocking the orthogonal components having a low frequency component and high frequency component.

As explained above, according to the first embodiment, even if all orthogonal components cannot perfectly be extracted, when at least the low frequency components which are most important for forming an image plane can be extracted, a reproduced image plane can be formed by using the low frequency components thus extracted. As a result, the image can be always updated by newly reproduced signals over a wide area of the image plane and the scene changes even in the high-speed reproduction can be effectively reproduced.

Next, an explanation will be made below of a digital video signal reproducing apparatus according to a second embodiment of this invention shown in FIG. 2.

Figure 2:
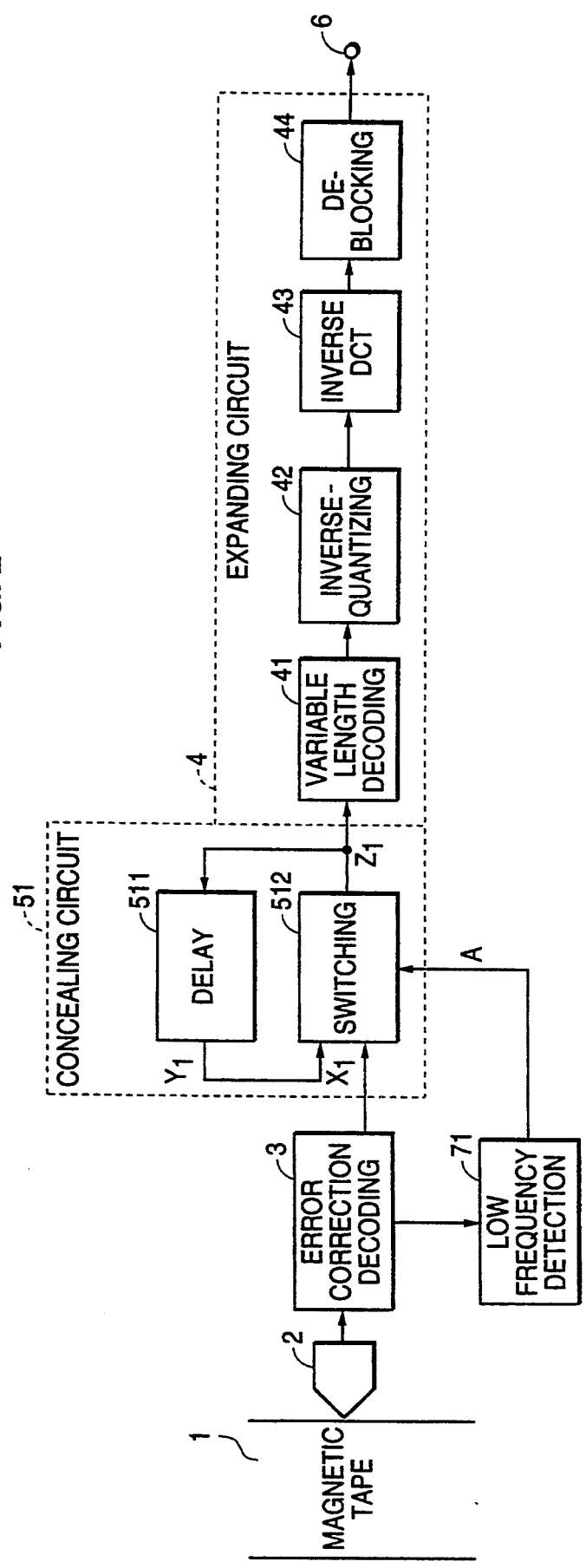
FIG. 2 is a block diagram of a digital video signal reproducing apparatus according to a second embodiment of this invention.

The second embodiment of FIG. 2 differs from the first embodiment of FIG. 1 in that a low frequency detection circuit 71 which detects a low frequency component from an error detection data obtained from the signal sent from the reproducing head 2 by the error correction decoding circuit 3 is used instead of the low frequency detection circuit 70 of FIG. 1, and in that a concealing circuit 51 is provided just next to the error correction decoding circuit 3 instead of the concealing circuit 50 of FIG. 1. This embodiment is applicable to a recording format on the magnetic tape in which the detection of the position of the reproduced signal obtained from the reproducing head 2 on the image plane and the judgment as to whether or not the recorded signal is the low frequency component are possible at the error correction decoding stage. An example of this will be explained below.

In general, in a digital reproducing apparatus such as, for example, a digital VTR, synchronization of reproduction processings for a recording signal is taken by means of a synchronizing signal (SYNC) recorded in a unit of a specific number of data (sync. block). Also, the sync. block has an individual data (called, for example, an ID) showing an address of the sync. block, and based on the ID, the position of the data in the sync. block on the image plane can be known.

The error correction decoding circuit 3 executes the error correction decoding in the sync. block unit. However, in event that the SYNC cannot be extracted due to generation of errors for a long period of time resulting from defects formed on the magnetic tape 1, or errors which are too large to be corrected by the circuit 3, the data extraction in the sync. block unit becomes impossible. In such case, the error correction decoding circuit 3 outputs an error detection information showing that the recording signal cannot be extracted.

As shown above, in the recording format in which the information of the SYNC or ID shows the existence of a necessary low frequency component, the low frequency detection circuit 71 can detect whether or not the sync. block including the low frequency component has been detected by means of an error detection information based on only the detection of the sync. block (that is, the fact that the sync. block has been correctly detected) at the stage of the error correction decoding circuit 3.

In addition, all signals $X_1$, $Y_1$, and $Z_1$ processed by a switching circuit 512 and a delay circuit 511 of the concealing circuit 51 are signals from the error correction decoding circuit 3, which are under a compressed state before being expanded to a digital video signal.

As explained above, by providing the low frequency detection circuit 71 and the concealing circuit 51 just next to the error correction decoding circuit 3, the concealing of the same low frequency detection type as in the first embodiment can be executed. In this case, if the delay circuit 511 in this embodiment has a delay time equal to that of the delay circuit 501 in the first embodiment, since the data to be delayed is a signal under a compressed state before being expanded, the delay processing is to be executed at a time when the data is smallest in amount. As a result, the delay circuit 511 can be provided in a smaller circuit scale than that of the delay circuit 501 in the first embodiment, being largely effective from the viewpoint of practical circuit design and cost.

Figure 3:
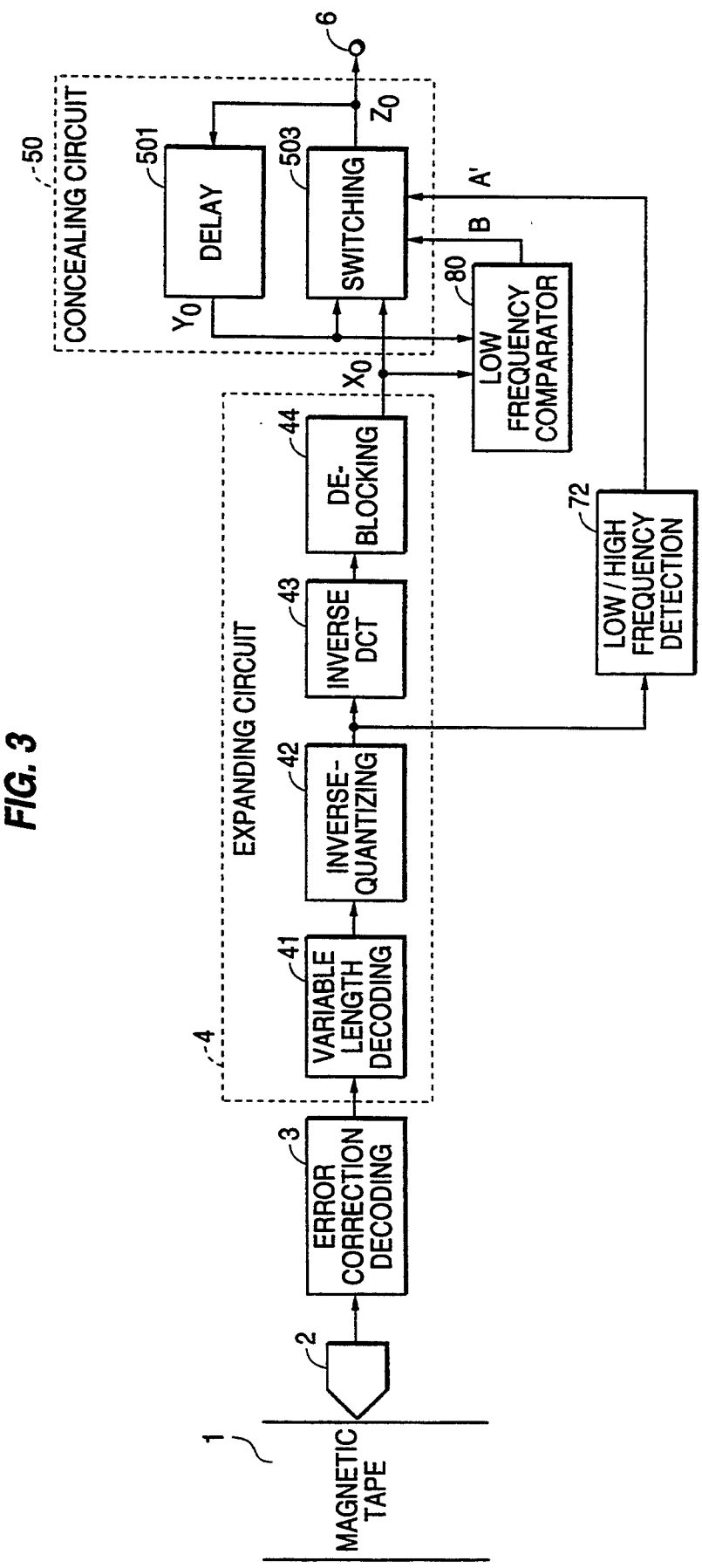
FIG. 3 a block diagram of a digital video signal reproducing apparatus according to a third embodiment of this invention.

Next, a digital video signal reproducing apparatus according to a third embodiment of this invention will be explained below while referring to FIG. 3 showing a block diagram thereof. In this embodiment, a low/high frequency detection circuit 72 is provided instead of the low frequency detection circuit 70 in the first embodiment shown in FIG. 1, and a low frequency comparator circuit 80 is newly provided. Also, a switching circuit 503 is provided in the concealing circuit 50, which effects switching the signal $X_0$ and signal $Y_0$ in response to a detection signal A′ sent from the low/high frequency detection circuit 72 and a comparing detection signal B sent from the low frequency comparator circuit 80. The operation of the apparatus of this embodiment will be explained below.

The low/high frequency detection circuit 72 detects whether or not a low frequency component has been extracted on a block by block basis and at the same time, whether or not a high frequency component has been extracted on a block by block basis in response to a signal sent from the inverse-quantizing circuit 42 of the expanding circuit 4. Then, the low/high frequency detection circuit 72 outputs the detection signal A′ to the switching circuit 501. In this case, the detection signal A′ may show that the low frequency component cannot be extracted, that the low frequency component can be extracted and the high frequency component cannot be extracted, or that the low and high frequency components both can be extracted.

The low frequency comparator circuit 80 compares the low frequency component of the signal $X_0$ sent from the expansion processing circuit 4 and that of the signal $Y_0$ sent from the delay circuit 501 in a block unit to detect whether or not the low frequency components of both are substantially equal to each other, thereby outputting a comparing detection signal B. The signal B is, together with the detection signal A′ from the low/high frequency detection circuit 72, sent to the switching circuit 503 of the concealing circuit 50.

The switching circuit 503 outputs the signal $Y_0$ as the signal $Z_0$ when the detection signal $A'$ shows that the low frequency component cannot be extracted. When the detection signal $A'$ shows that both the low frequency component and high frequency component can be extracted, the switching circuit 503 outputs the signal $X_0$ as the signal $Z_0$. However, when the detection signal $A'$ shows that the low frequency component can be extracted and the high frequency component cannot be extracted, if the low frequency components of the signal $X_0$ and the signal $Y_0$ are found to be substantially equal to each other by the comparing detection signal B, the switching circuit 503 outputs the signal $Y_0$ as the signal $Z_0$, and on the other hand, if found not to be substantially equal to each other, it outputs the signal $X_0$ which is an output signal from the expanding circuit 4 as the signal $Z_0$.

In a case where reproduction of a still image area recorded for a long period of time is made at a high speed or super high speed, even if the data is new on a time basis, the formation of a reproduced image plane with a digital video signal having only the frequency components results in the elimination of the high frequency components of the previous image, so that the reproduced image quality may be degraded in spite of the fact that the reproduced image plane immediately before was extremely fine including the high frequency components.

However, in this embodiment, when only the low frequency components have been extracted, the concealment is performed only when the low frequency components thus extracted are different from the low frequency components of the video signal being already displayed on the image plane. Accordingly, the degradation of the high-speed reproduced image plane in the still image plane as shown above can be prevented.

In addition, the low frequency comparator circuit 80 of this embodiment can be made in such a simple arrangement that the signal $Y_0$ is passed through a low pass filter (LPF) to extract only the low frequency component therefrom and then compared with the signal $X_0$ with respect to the pixel values. (The comparing detection signal B obtained from the low frequency comparator circuit 80 is effective only when there exist only a low frequency component in the signal $X_0$, so that a LPF for extracting the low frequency component from the signal $X_0$ is not needed.)

Figure 4:
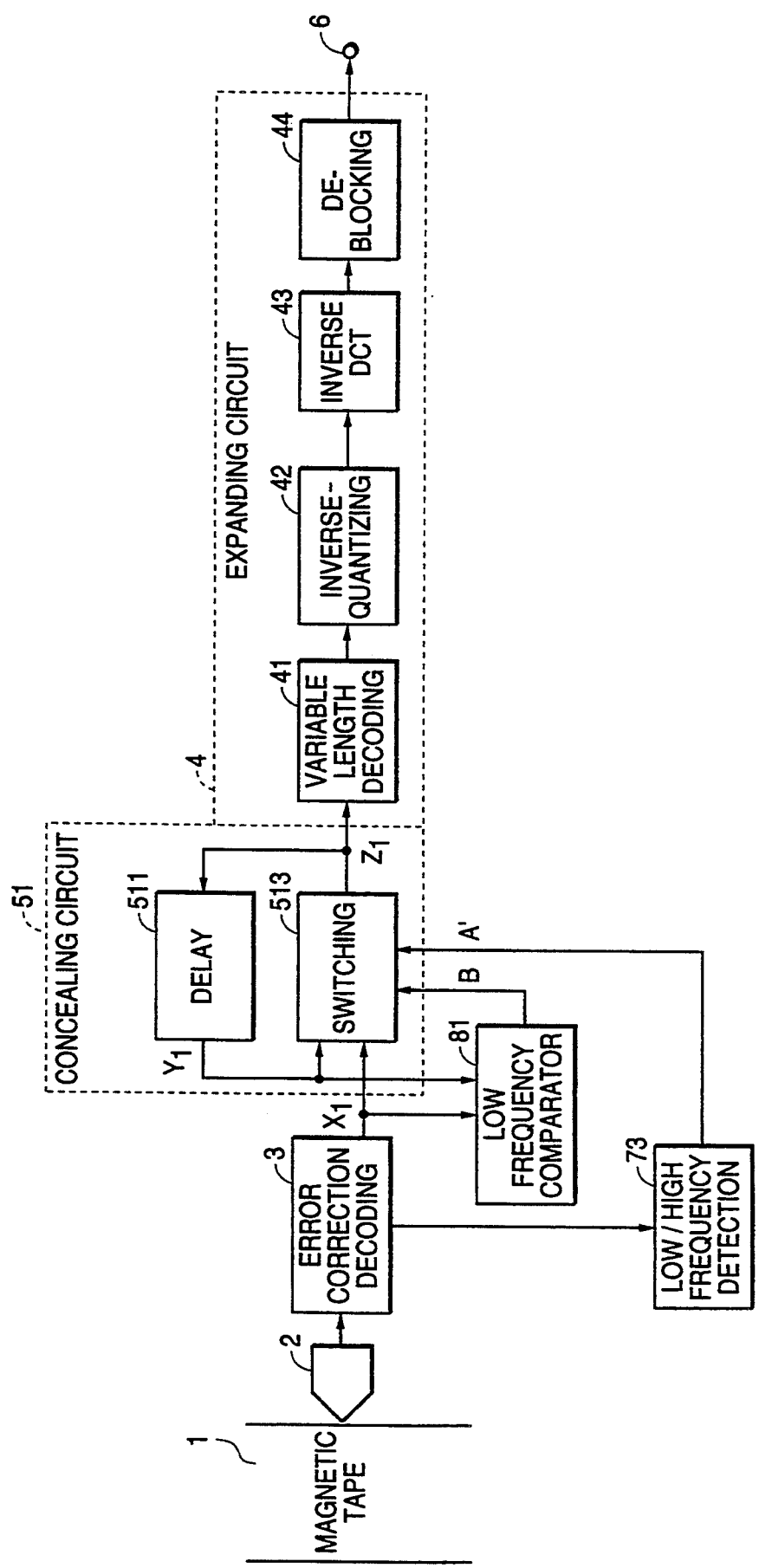
FIG. 4 is a block diagram of a digital video signal reproducing apparatus according to a fourth embodiment of this invention.

Next, explanation will be made on a digital video signal reproducing apparatus according to a fourth embodiment of this invention while referring to FIG. 4 showing a block diagram thereof. In this embodiment, a low/high frequency detection circuit 73 is provided instead of the low frequency detection circuit 71 in the second embodiment shown in FIG. 2, and a low frequency comparator circuit 81 is newly provided. A switching circuit 513 is provided in the concealing circuit 51, which switches the signal $X_1$ and the signal $Y_1$ to output the signal $Z_1$ in response to the detection signal $A'$ sent from the low frequency detection circuit 73 and the comparing detection signal B sent from the low frequency comparator circuit 81. The low/high frequency detection circuit 73 detects whether or not the low frequency component has been extracted on a block by block basis and at the same time, whether or not the high frequency component can be extracted on a block by block basis in response to an error detection information obtained from the error correction decoding circuit 3. Then, the low/high frequency detection circuit 73 sends the detection signal $A'$ to the switching circuit 513 as an output. In this case, the detection signal $A'$ may show that the low frequency component cannot be extracted, that the low frequency component can be extracted and the high frequency component cannot be extracted, and that the low and high frequency components both can be extracted.

In addition, the low frequency comparator circuit 81 compares the low frequency component of the signal $X_1$ sent from the error correction decoding circuit 3 and that of the signal $Y_1$ sent from the delay circuit 511 to detect whether or not the low frequency components of both are substantially equal to each other, thereby obtaining the comparing detection signal B. The comparing detection signal B is, together with the detection signal $A'$ obtained from the low/high frequency detection circuit 73, sent to the switching circuit 513 of the concealing circuit 51.

The switching circuit 513 outputs the signal $Y_1$ as the signal $Z_1$ when the detection signal $A'$ shows that the low frequency component cannot be extracted. When the detection signal $A'$ shows that both the low frequency component and high frequency component can be extracted, the switching circuit 513 outputs the signal $X_1$ as the signal $Z_1$. However, when the detection signal $A'$ shows that the low frequency component can be extracted and the high frequency component cannot be extracted, if the low frequency components of the signal $X_1$ and the signal $Y_1$ are found to be substantially equal to each other by the comparing detection signal B, the switching circuit 513 outputs the signal $Y_1$ as the signal $Z_1$, and on the other hand, if found not to be substantially equal to each other, it outputs the signal $X_1$ which is an output signal from the error correction decoding circuit 3 as the signal $Z_1$.

As explained above, by providing the low/high frequency detection circuit 73 and the concealing circuit 51 just next to the error correction decoding circuit 3, the concealing operation can be executed similarly to the case of the third embodiment. If the delay circuit 511 in this embodiment has a delay time equal to that of the delay circuit 501 of the third embodiment, since the data to be delayed is a signal under a compressed state before being expanded, the delay processing is executed at a time when the data is smallest in amount. As a result, the delay circuit 511 can be provided in a smaller circuit scale than that of the delay circuit 501 in the third embodiment, being largely effective from the viewpoint of practical circuit design and cost.

In addition, the low frequency comparator circuit 81 is designed such that the signal $X_1$ and $Y_1$ both are DCT coefficients being subjected to DCT operation and the detection as to whether or not the low frequency components of the both are substantially equal to each other may be made only by comparing the DCT coefficients corresponding to the low frequency components of the block to be detected. This means that it does not need a LPF differently from the low frequency comparator circuit 80 in the third embodiment, being largely effective on a practical basis. Also, more simply, comparative detection of the low frequency components may be made by comparing only the direct current components (equivalent to the average of the total pixel values) of the DCT coefficients.

As described above, according to this embodiment, when the low frequency component can be extracted and the high frequency component cannot be extracted, the concealing operation is executed only when the low frequency component thus extracted is different from a low frequency component of a video signal already displayed on the image plane. As a result, deterioration of fineness of a high-speed reproduced image plane in the still image plane can be prevented. In addition, the low/high frequency detection can be executed at the stage of the orthogonal transformation coded signal, so that judgment can be made in the range of either direct current components only or low frequency components that could be extracted, being largely effective from the viewpoint of practical use. Also, delay processing necessary to obtain a signal at a time immediately before a current time is executed at a stage where the data rate is the lowest and the delay amount may be made extremely small, being practical on a circuit scale basis.

In addition, in the first embodiment, the concealing circuit 50 is provided just next to the de-blocking circuit 44, but it may be provided at a position just before the inverse-DCT circuit 43, that is, at the stage where the orthogonal components are quantized. Further, in the third embodiment, the concealing circuit 50 and the low frequency comparator circuit 80 are provided just next to the de-blocking circuit 44, but these may be provided at a position just before the inverse-DCT circuit 43, that is, at the stage where the orthogonal components are quantized. In this case, particularly, comparison of the low frequency components by the low frequency comparator circuit 80 can be made by comparing the DCT coefficients, so that a LPF is not needed differently from the third embodiment and the low frequency comparison can be effectively made by comparing the DCT coefficients corresponding to the extracted low frequency components.

What is claimed is:

1. A digital video signal reproducing apparatus for reproducing a digital video signal from coded data recorded on a recording medium, said coded data having been produced by subjecting an original digital video signal to orthogonal transformation quantization and encoding and recorded on the recording medium, said apparatus comprising:

reproducing means for reproducing said coded data from the recording medium to obtain reproduced coded data;

decoding means for decoding the reproduced coded data to obtain reproduced quantized data;

inverse-quantization means for subjecting the reproduced quantized data to inverse-quantization to obtain reproduced orthogonal transformed coefficients;

inverse-orthogonal transformation means for subjecting the reproduced orthogonal transformed coefficients to inverse-orthogonal transformation to obtain a current reproduced digital video signal;

low frequency component detection means for detecting from the reproduced orthogonal transformed coefficients whether the current reproduced digital video signal contains a low frequency component and outputting a detection signal indicating that the current reproduced digital video signal contains said low frequency component; and concealing means for concealing the current reproduced digital video signal when said detection signal is not output by said low frequency detection means by using one of a previously reproduced digital video signal which has been reproduced previously to the current reproduced digital video signal and a subsequently reproduced digital video signal which is reproduced subsequently to the current reproduced digital video signal to obtain a valid reproduced digital video signal, and for outputting the current reproduced digital video signal as is without concealing as the valid reproduced digital video signal when said detection signal is output by said low frequency component detection means.

2. The apparatus according to claim 1, wherein said concealing means comprises delay means for delaying the valid reproduced digital video signal for a predetermined period of time, and switching means for selectively outputting an output signal of said delay means and the current reproduced digital video signal, said switching means being responsive to said detection signal for outputting the current reproduced digital video signal and for otherwise outputting the output signal of said delay means.

3. The apparatus according to claim 2, wherein said predetermined period of time is one frame period.

4. The apparatus according to claim 4, wherein said orthogonal transformation and said inverse-orthogonal transformation are discrete cosine transformation and inverse-discrete cosine transformation, respectively.

5. A digital video signal reproducing apparatus for reproducing a digital video signal from coded data recorded on a recording medium, said coded data having been produced by subjecting an original digital video signal to orthogonal transformation, quantization and encoding and recorded on the recording medium, said apparatus comprising:

reproducing means for reproducing said coded data from the recording medium to obtain reproduced coded data;

decoding means for decoding the reproduced coded data to obtain reproduced quantized data;

inverse-quantization means for subjecting the reproduced quantized data to inverse-quantization to obtain reproduced orthogonal transformed coefficients;

inverse-orthogonal transformation means for subjecting the reproduced orthogonal transformed coefficients to inverse-orthogonal transformation to obtain a current reproduced digital video signal;

frequency component detection means for detecting from the reproduced orthogonal transformed coefficients that the current reproduced digital video signal is either devoid of a low frequency component, contains a low frequency component and is devoid of a high frequency component, or contains both a low frequency component and a high frequency component, and for outputting a first detection signal indicating a corresponding detection result;

comparison means for comparing the low frequency component of the current reproduced digital video signal with a low frequency component of one of a previously reproduced digital video signal which has been reproduced previously to the current reproduced digital video signal and a subsequently reproduced digital video signal which is reproduced subsequently to the current reproduced digital video signal and outputting a second detection signal indicating a corresponding comparison result; and concealing means for concealing the current reproduced digital video signal during either one of a first state and a second state of said first and second detection signals by using one of the previously reproduced digital video signal and the subsequently reproduced digital video signal to obtain a valid reproduced digital video signal, and for outputting the current reproduced digital video signal as is without concealing as the valid reproduced digital video signal during either one of a third state and a fourth state of said first and second detection signals;

wherein in said first state wherein in said third state said first detection signal indicates that the current reproduced digital video signal contains a low frequency component and is devoid of a high frequency component, and said second detection signal indicates that the low frequency component of the current reproduced digital video signal is approximately the same as the low frequency component of the one of the previously reproduced digital video signal and the subsequently reproduced digital video signal;

wherein in said second state said first detection signal indicates that the current reproduced digital video signal is devoid of a low frequency component;

wherein in said third state said first detection signal indicates that the current reproduced digital video signal contains a low frequency component and is devoid of a high frequency component, and said second detection signal indicates that the low frequency component of the current reproduced digital video signal is different from the low frequency component of the one of the previously reproduced digital video signal and the subsequently reproduced digital video signal; and wherein in said fourth state said first detection signal indicates that the current reproduced digital video signal contains both a low frequency component and a high frequency component.

6. The apparatus according to claim 5, wherein said concealing means comprises delay means for delaying the valid reproduced digital video signal for a predetermined period of time, and switching means for selectively outputting an output signal of said delay means and the current reproduced digital video signal, said switching means being responsive to said first and second detection signals for outputting the current reproduced digital video signal when said first detection signal indicates that the current reproduced digital video signal contains only a low frequency component and said second detection signal indicates that the low frequency component of the current reproduced digital video signal is different from the low frequency component of the one of the previously reproduced digital video signal and the subsequently reproduced digital video signal and for otherwise outputting the output signal of said delay means.

7. The apparatus according to claim 6, wherein said predetermined period of time is one frame period.

8. The apparatus according to claim 5, wherein said orthogonal transformation and said inverse-orthogonal transformation are discrete cosine transformation and the inverse-discrete cosine transformation, respectively.

9. A digital video signal reproducing apparatus for reproducing a digital video signal from coded data recorded on a recording medium, said coded data having been produced by subjecting an original digital video signal to orthogonal transformation, quantization, variable length coding and error correction coding and recorded on the recording medium, said apparatus comprising:

reproducing means for reproducing said coded data from the recording medium to obtain reproduced coded data;

error correction decoding means for subjecting the reproduced coded data to error correction decoding to obtain a current reproduced error correction decoded data;

detection means for detecting from the current reproduced error correction decoded data whether the current reproduced error correction decoded data contains a low frequency component data corresponding to a low frequency component of the digital video signal and outputting a detection signal indicating that the current reproduced error correction decoded data contains a low frequency component data;

concealing means for concealing the current reproduced error correction decoded data when said detection signal is not output by said detection means by using one of a previously reproduced error correction decoded data which has been reproduced previously to the current reproduced error correction decoded data and a subsequently reproduced error correction decoded data which is reproduced subsequently to the current reproduced error correction decoded data to obtain a valid reproduced error correction decoded data, and for outputting the current reproduced error correction decoded data as is without concealing as the valid reproduced error correction decoded data when said detection signal is output by said detection means;

variable length decoding means for decoding the valid reproduced error correction decoded data to obtain reproduced quantized data;

inverse-quantization means for subjecting the reproduced quantized data to inverse-quantization to obtain reproduced orthogonal transformed coefficients;

inverse-orthogonal transformation means for subjecting the reproduced orthogonal transformed coefficients to inverse-orthogonal transformation to obtain a reproduced digital video signal.

10. The apparatus according to claim 9, wherein said concealing means comprises delay means for delaying the valid reproduced error correction decoded data for a predetermined period of time, and switching means for selectively outputting an output data of said delay means and the current reproduced error correction decoded data, said switching means being responsive to said detection signal for outputting the current reproduced error correction decoded data and for otherwise outputting the output data of said delay means.

11. The apparatus according to claim 10, wherein said predetermined period of time is one frame period.

12. The apparatus according to claim 9, wherein said orthogonal transformation and said inverse-orthogonal transformation are discrete cosine transformation and inverse-discrete cosine transformation, respectively.

13. A digital video signal reproducing apparatus for reproducing a digital video signal from coded data recorded on a recording medium, said coded data having been produced by subjecting an original digital video signal to orthogonal transformation, quantization, variable length coding and error correction coding and recorded on the recording medium, said apparatus comprising:

reproducing means for reproducing said coded data from the recording medium to obtain reproduced coded data;

error correction decoding means for subjecting the reproduced coded data to error correction decoding to obtain a current reproduced error correction decoded data;

detection means for detecting from the current reproduced error correction decoded data that the current reproduced error correction decoded data is either devoid of a low frequency component data corresponding to a low frequency component of the digital video signal, contains the low frequency component data and is devoid of a high frequency component data corresponding to a high frequency component of the digital video signal, or contains both the low frequency component data and the high frequency component data, and for outputting a first detection signal indicating a corresponding detection result;

comparison means for comparing the low frequency component data of the current reproduced error correction decoded data with a low frequency component data of one of a previously reproduced error correction decoded data which has been reproduced previously to the current reproduced error correction decoded data and a subsequently reproduced error correction decoded data which is reproduced subsequently to the current reproduced error correction decoded data and outputting a second detection signal indicating a corresponding comparison result;

concealing means for concealing the current reproduced error correction decoded data during either one of a first state and a second state of said first and second detection signals by using one of the previously reproduced error correction decoded data and the subsequently reproduced error correction decoded data to obtain a valid reproduced error correction decoded data, and for outputting the current reproduced error correction decoded data as is without concealing as the valid reproduced error correction decoded data during either one of a third state and a fourth state of said first and second detection signals variable length decoding means for decoding the valid reproduced error correction decoded data to obtain reproduced quantized data;

inverse-quantization means for subjecting the reproduced quantized data to inverse-quantization to obtain reproduced orthogonal transformed coefficients;

inverse-orthogonal transformation means for subjecting the reproduced orthogonal transformed coefficients to inverse-orthogonal transformation to obtain a reproduced digital video signal;

wherein in said first state said first detection signal indicates that the current reproduced error correction decoded data contains the low frequency component data and is devoid of the high frequency component data, and said second detection signal indicates that the low frequency component data of the current reproduced error correction decoded data is approximately the same as the low frequency component data of the one of the previously reproduced error correction decoded data and the subsequently reproduced error correction decoded data;

wherein in said second state said first detection signal indicates that the current reproduced error correction decoded data is devoid of the low frequency component data;

wherein in said third state said first detection signal indicates that the current reproduced error correction decoded data contains the low frequency component data and is devoid of the high frequency component data, and said second detection signal indicates that the low frequency component data of the current reproduced error correction decoded data is different from the low frequency component data of the one of the previously reproduced error correction decoded data and the subsequently reproduced error correction decoded data; and wherein in said fourth state said first detection signal indicates that the current reproduced error correction decoded data contains both the low frequency component data and the high frequency component data.

14. The apparatus according to claim 13, wherein said concealing means comprises delay means for delaying the valid reproduced error correction decoded data for a predetermined period of time, and switching means for selectively outputting an output data of said delay means and the current reproduced error correction decoded data, said switching means being responsive to said first and second detection signals for outputting the current reproduced error correction decoded data only when said first detection signal indicates that the current reproduced error correction decoded data contains only a low frequency component data and said second detection signal indicates that the low frequency component data of the current reproduced error correction decoded data is different from the low frequency component data of the one of the previously reproduced error correction decoded data and the subsequently reproduced error correction decoded data and for otherwise outputting the output data of said delay means.

15. The apparatus according to claim 14, wherein said predetermined period of time is one frame period.

16. The apparatus according to claim 13, wherein said orthogonal transformation and said inverse-orthogonal transformation are discrete cosine transformation and inverse-discrete cosine transformation, respectively.

17. In a digital video signal reproducing apparatus for reproducing a digital video signal from coded data recorded on a recording medium, said coded data having been produced by subjecting an original digital video signal to orthogonal transformation, quantization and encoding and recorded on the recording medium, and for concealing the reproduced digital video signal, an improvement comprising:

a low frequency component detection means for detecting that a current reproduced digital video signal is either devoid of a low frequency component, contains a low frequency component and is devoid of a high frequency component, or contains both a low frequency component and a high frequency component, and for outputting a first detection signal indicative of a corresponding detection result;

comparison means for comparing the low frequency component of the current reproduced digital video signal with a low frequency component of one of a previously reproduced digital video signal which has been reproduced previously to the current reproduced digital video signal and a subsequently reproduced digital video signal which is reproduced subsequently to the current reproduced digital video signal and outputting a second detection signal indicating a corresponding comparison result; and concealing means for concealing the current reproduced digital video signal during either one of a first state and a second state of said first and second detection signals by using one of the previously reproduced digital video signal and the subsequently reproduced digital video signal to obtain a valid reproduced digital video signal, and for outputting the current reproduced digital video signal as is without concealing as the valid reproduced digital video signal during either one of a third state and a fourth state of said first and second detection signals.

wherein in said first state said first detection signal indicates that the current reproduced digital video signal contains a low frequency component and is devoid of a high frequency component, and said second detection signal indicates that the low frequency component of the current reproduced digital video signal is approximately the same as the low frequency component of the one of the previously reproduced digital video signal and the subsequently reproduced digital video signal;

wherein in said second state said first detection signal indicates that the current reproduced digital video signal is devoid of a low frequency component;

wherein in said third state said first detection signal indicates that the current reproduced digital video signal contains a low frequency component and is devoid of a high frequency component, and said second detection signal indicates that the low frequency component of the current reproduced digital video signal is different from the low frequency component of the one of the previously reproduced digital video signal and the subsequently reproduced digital video signal; and wherein in said fourth state said first detection signal indicates that the current reproduced digital video signal contains both a low frequency component and a high frequency component.

* * * * *